United States Patent [19]
Burleigh

[11] Patent Number: 5,228,746
[45] Date of Patent: Jul. 20, 1993

[54] CHILD SAFETY SEAT

[75] Inventor: Adrian S. Burleigh, Bognor Regis, England

[73] Assignee: Britax - Excelsior Limited, England

[21] Appl. No.: 669,921

[22] Filed: Mar. 15, 1991

[30] Foreign Application Priority Data

Mar. 16, 1990 [GB] United Kingdom ................ 9005999

[51] Int. Cl.⁵ ............................................. A47C 1/08
[52] U.S. Cl. .................................... 297/250; 297/485
[58] Field of Search ............. 227/250, 253, 254, 255, 227/256, 251, 485; 297/130

[56] References Cited

U.S. PATENT DOCUMENTS

| | | |
|---|---|---|
| 4,634,177 | 1/1987 | Meeker . |
| 4,687,255 | 8/1987 | Klanner et al. .............. 297/250 X |
| 4,762,364 | 8/1988 | Young . |
| 4,913,490 | 4/1990 | Takahashi et al. ............... 297/250 |
| 5,052,750 | 10/1991 | Takahashi et al. ............... 297/250 |

FOREIGN PATENT DOCUMENTS

| | | |
|---|---|---|
| 3137917 | 9/1981 | Fed. Rep. of Germany . |
| 3634501 | 10/1986 | Fed. Rep. of Germany . |
| 3826932 | 8/1988 | Fed. Rep. of Germany . |
| 2136685 | 9/1984 | United Kingdom .............. 297/250 |
| 2202433 | 3/1988 | United Kingdom . |
| 82/01520 | 10/1981 | World Int. Prop. O. . |

*Primary Examiner*—Laurie K. Cranmer
*Attorney, Agent, or Firm*—Davis, Bujold & Streck

[57] ABSTRACT

A forward facing child safety seat has a seat body, and a base portion adapted to rest on a motor vehicle seat and to be secured in position on the vehicle seat by means of an adult lap belt which passes between the seated occupant of the child seat and the adult seat-back. The base portion has a rear projection adapted to extend towards the vehicle seat-back above the level of the vehicle seat and two side projections extending upwardly and rearwardly from the sides of the base portion so as to define respective slots with the side edges of the rearwardly projecting portion, each side projection having an upper surface above the level of the rear projection.

12 Claims, 4 Drawing Sheets

CHILD SAFETY SEAT

FIELD OF THE INVENTION

This invention relates to a forward facing child safety seat of the type having a seat body with a seat portion and a backrest portion for the child, and a base portion adapted to rest on a motor vehicle seat and to be secured in position on the vehicle seat by means of an adult lap belt which passes between the seated occupant of the child seat and the adult seat-back. With this type of seat, a separate harness is used to secure a child in the child safety seat which can therefore remain secured to the vehicle seat by the adult seat belt when unoccupied.

The choice of the location for the attachment points on the child seat which are engaged by the adult seat belt is a compromise. On the one hand, it is desirable for the child seat to be located as close as possible to the adult seat-back so as to maximise the available space between a seated child and the next fixed obstacle in front of the child seat (the seat-back of the front vehicle seat when the child seat is used on a rear vehicle seat). On the other hand, it is necessary for these attachment points to be sufficiently far from the vehicle seat to leave room for the adult seat belt buckle which may itself be mounted on a rigid stalk or bracket. In addition, in some vehicles, the outboard anchorage points for the adult lap seat belt may be located close to or even forward of the adult seat-back.

SUMMARY OF THE INVENTION

According to the invention, in a child safety seat of the type described above, the base portion having a rear projection adapted to extend towards the vehicle seatback above the level of the vehicle seat and two side projections extending upwardly and rearwardly from the sides of the base portion so as to define respective slots with the side edges of the rearwardly projecting portion, each side projection having an upper surface above the level of the rear projection.

In use, the adult lap belt is led over the upper edge of the side portion on one side of the seat, through the adjacent slot, below the rear projection, up through the other slot and over the upper surface of the other side member.

The base portion may be formed integrally with the seat body. Alternatively, the seat body may be mounted on the base portion by means allowing the orientation of the seat body to be adjusted between an upright position and a reclined position.

In one form of the invention, the side projections take the form of side arms which are movable relative to the base portion so as to permit adjustment of the height of their upper surfaces above the vehicle seat. The side arms may be pivotally mounted on the base portion.

BRIEF DESCRIPTION DRAWINGS

FIG. 1 is a perspective view of a child safety seat in accordance with an embodiment of the invention;

FIGS. 2, 3, 4 and 5 are sectional views taken on the lines 2—2, 3—3, 4—4 and 5—5 in FIG. 1;

DETAILED DESCRIPTION

Figure 6:
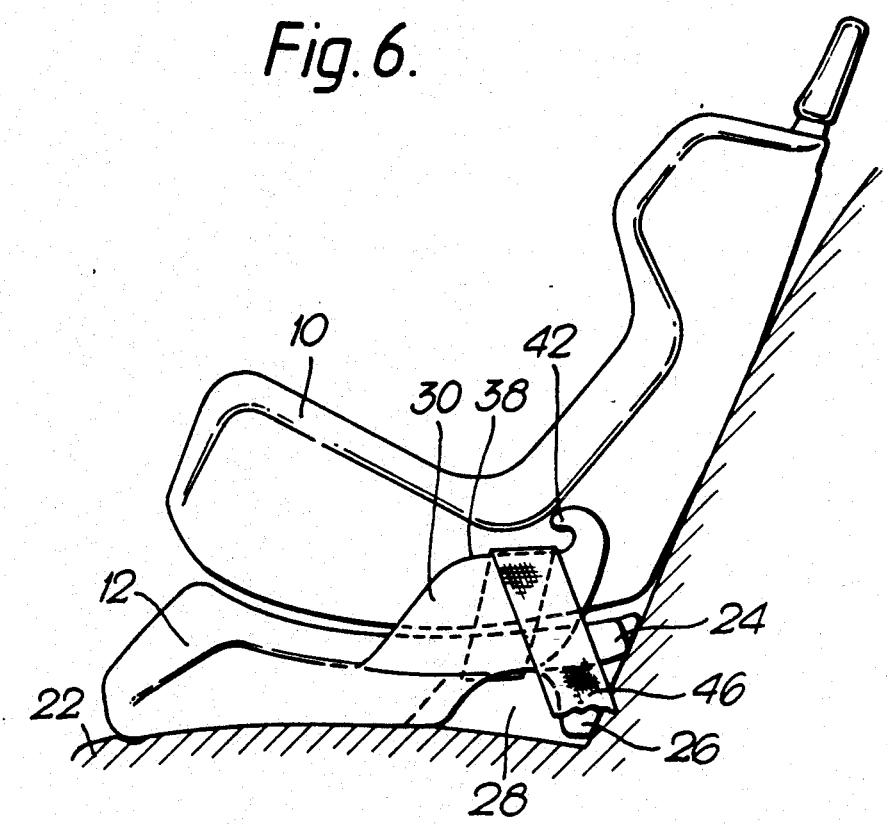
FIG. 6 is a side view of the seat shown in FIG. 1.
Figure 7:
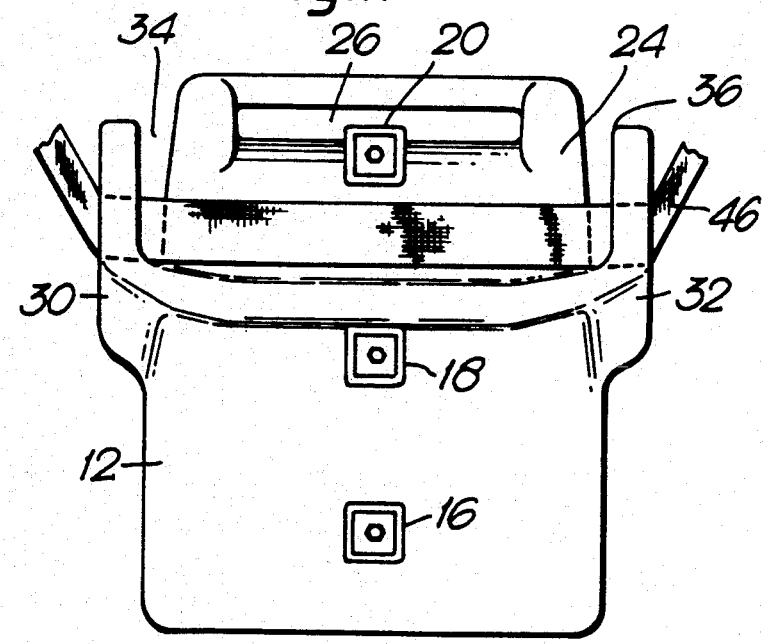
FIG. 7 is an underneath plan view of the seat shown in FIG. 1.

FIGS. 1 to 7 show a child's safety seat having a seat body 10 mounted on a base 12 by means of an arcuate track 14. The arcuate track 14 is secured to the base member 12 by fixtures 16, 18 and 20 (FIG. 7). Seats of this type are well known. Examples are disclosed in GB-A-2202433 and DE-A-3514208. The precise details of the arcuate track coupling form no part of the present invention and will not be described further.

Figure 1:
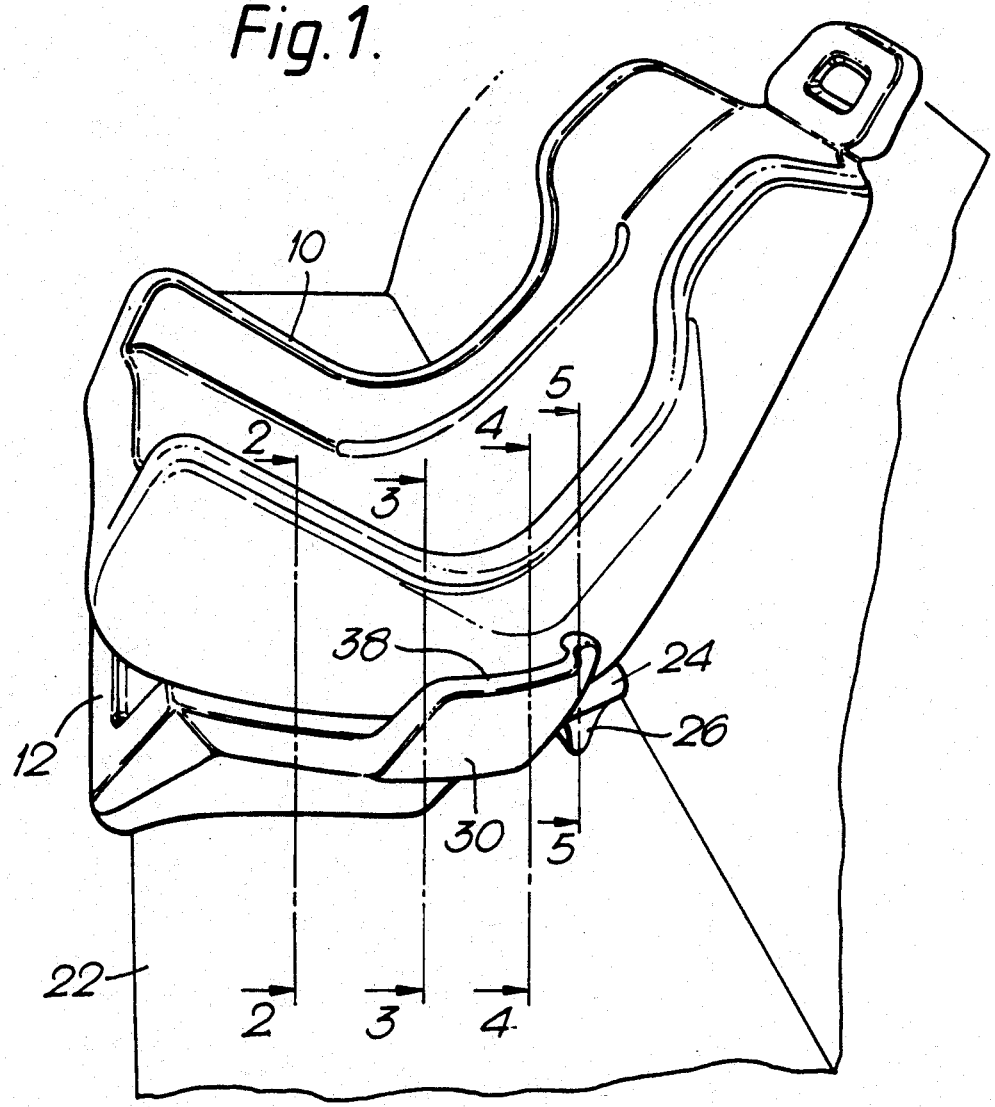
Figure 2:
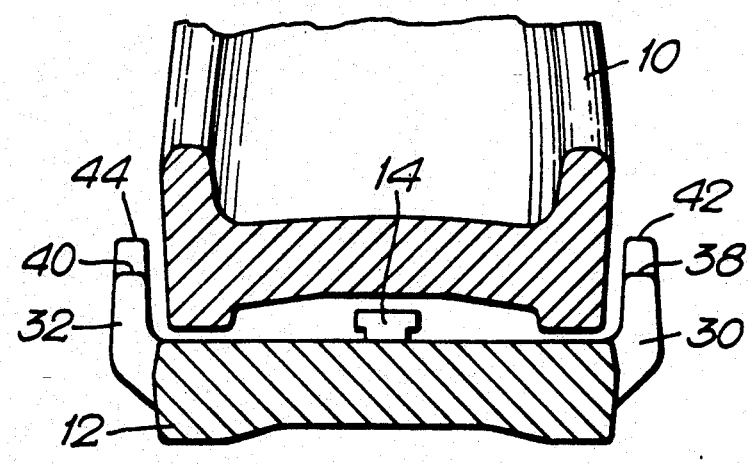
Figure 3:
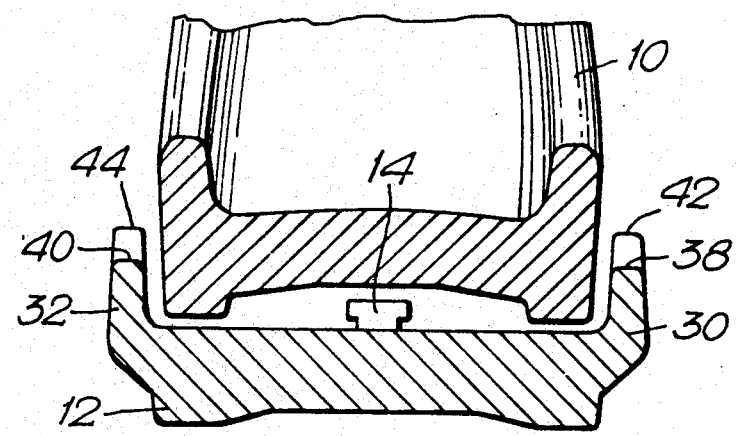
Figure 4:
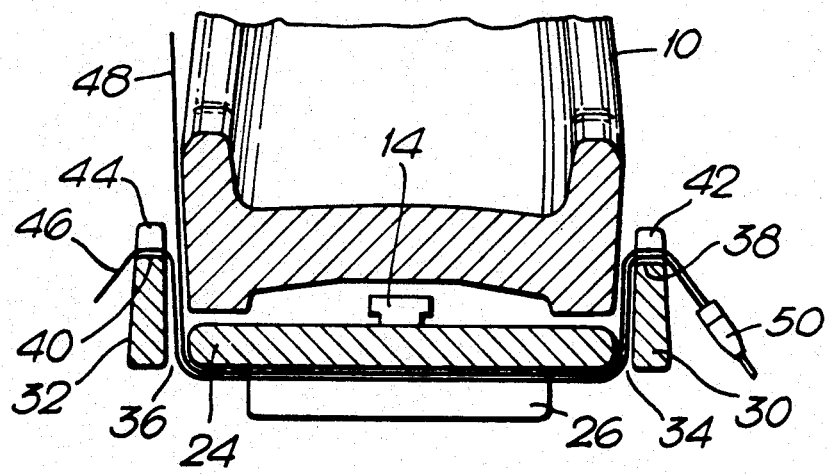
Figure 5:
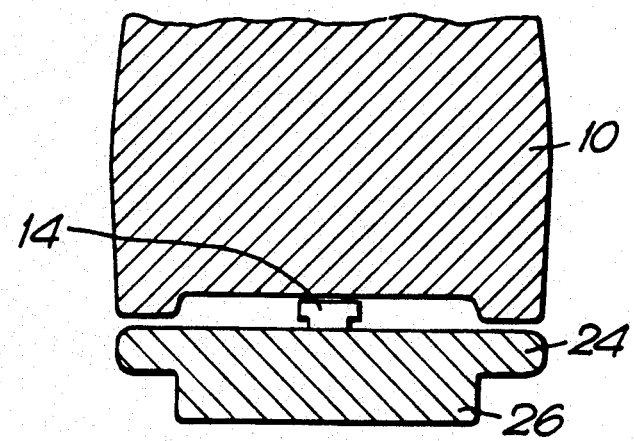

As can best be seen from FIGS. 1 and 6, the base member 12 rests on a vehicle seat 22 and has a rear projection 24, the bottom surface of which is above the seat 22. A rear leg 26 is formed on the rear extremity of the projection 26 and extends downwardly into contact with the vehicle seat 22 so as to define a passageway 28 between the vehicle seat 22 and the rear projection 24.

The main body of the base member 12 also has two upwardly projecting side flanges 30 and 32, one on each side of the seat body 10. The side flanges 30 and 32 also project rearwardly parallel to the rear projection 24 but so as to leave respective slots 34 and 36 therebetween. At the rear ends, the top surfaces 38 and 40 of the side flanges 30 and 32 have forwardly directed hook formations 42 and 44.

The child's seat can be secured on the vehicle seat 22 using an adult seat belt having a lap strap 46 and a shoulder strap 48 (FIGS. 4 and 6) each of which forms part of a continuous belt passing freely through a slot in a buckle 50. The straps 46 and 48 over the top surface 38 of the side flange 30, down through the slot 34 through the channel 28 under the rear projection 24, and up through the slot 36. The lap strap 46 continues down over the top surface 40 of the other side flange 32. The hook formations 42 and 44 stop the belt 46 from slipping off the back edges of the top surfaces 38 and 40.

The downward deflection of the path of the lap strap 46 and shoulder strap 48 by the rear projection 24 enables the seat body 10 to be located closer to the vehicle seat 22 than would be possible if the lap belt 46 had to follow a straight path between the surfaces 38 and 40. The friction resulting from trapping the shoulder strap 48 between the lap strap 46 and the rear projection 24 reduces the risk of any slack in the shoulder strap 48 feeding through the buckle 50 into the lap strap 46.

Installation of the child seat is straightforward. The buckle is fastened and the child seat positioned on the vehicle seat 22 so that the straps 46 and 48 are in the channel 28. Next, the two ends of the straps 46 and 48 are hooked over the two side flanges 30 and 32. Any slack in the lap strap 46 is then pulled through the buckle 50 and the resulting slack in the shoulder strap 48 pulled through to the opposite side of the seat. Downward pressure on the seat reduces the friction between the abutting surfaces of the lap and shoulder straps 46 and 48 during this tightening operation.

Figure 8:
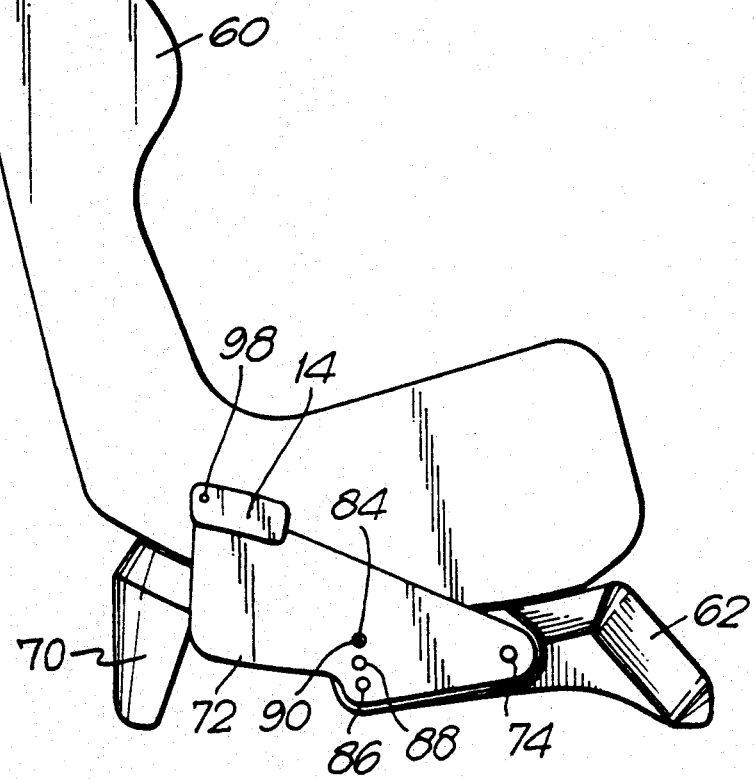
FIG. 8 is a side view of a child safety seat in accordance with another embodiment of the invention.
Figure 9:
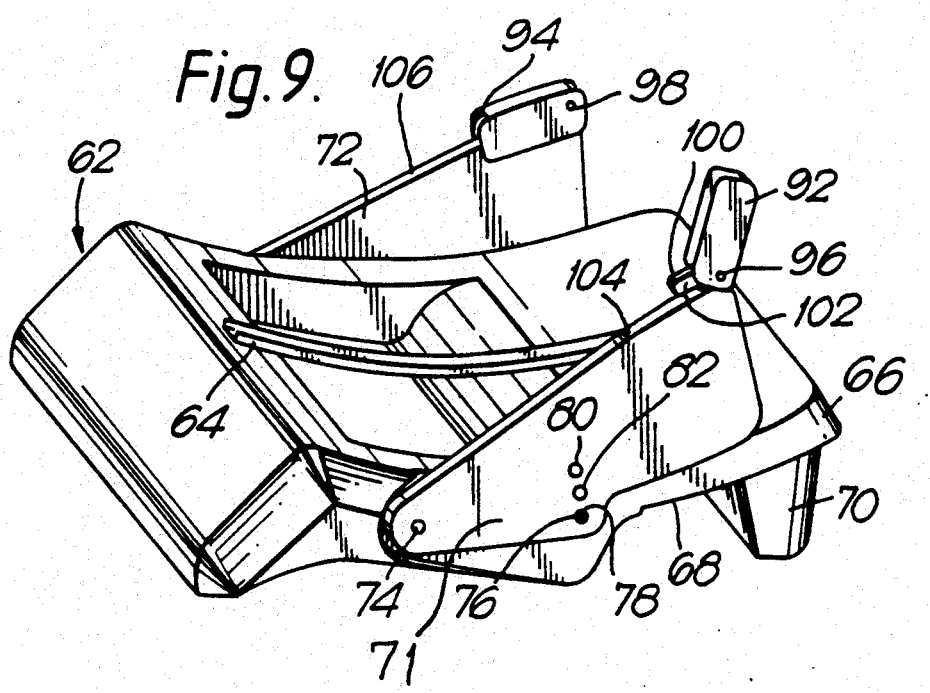
FIG. 9 is a perspective view of the base portion of the seat shown in FIG. 8.

The embodiment of the invention illustrated in FIGS. 1-7 suffers from the disadvantage that, if the top surfaces 38 and 40 of the side flanges 30 and 32 are positioned at a sufficient height above the bottom of the base member 12 to cope with the requirements for installation in some vehicles, they may be too high for installation in other vehicles. The straps 46 and 48 of the adult seat belt may be too short. In addition, there may be problems if the surface 38 adjacent to the buckle 50 is at a height such that it is coincident with rigid hardware on one of the straps 46 and 48. FIGS. 8 and 9 illustrate another embodiment of the invention which is not subject to these disadvantages.

FIGS. 8 and 9 show a child safety seat having a seat body 60 mounted on a base member 62 by means of an arcuate track 64 (FIG. 9). The seat body 60 and the track 64 are identical with the seat body 10 and track 14 shown in FIGS. 1 to 7.

As can best be seen from FIG. 9, the base member 62 has a rear projection 66, the bottom surface 68 of which is above the vehicle seat (not shown). A rear leg 70 extends downwardly from the rear extremity of the projection 66 so as to rest on the vehicle seat and define a passageway for the adult seat belt.

In contrast to the embodiment illustrated in FIGS. 1 to 7, the base member 62 carries two side arms 71 and 72 which are pivotally mounted on a shaft 74 for mutually independent angular movement between a lower position as shown in FIG. 8, and an upper position as shown in FIG. 9. The arm 71 may be secured in its upper position, its lower position or in an intermediate position by inserting a bolt 76 through one of three alternative holes 78, 80 and 82 as illustrated in FIG. 9. The other arm 72 may be similarly secured by a bolt 84 and three holes 86, 88 and 90.

Respective belt locks 92 and 94 are mounted on respective pivot pins 96 and 98 at the upper rear ends of the arms 71 and 72. The belt lock 92 is illustrated in its released position in which it is pivoted upwardly to a position in which it exposes a limb 100 formed integrally with the arm 71 so as to define a slot 102 with the upper surface 104 thereof. After an adult seat belt strap has been positioned in the slot 102, the U-shaped belt lock 92 is pivoted downwardly so that said adult belt is pressed down on each side of the limb 100 by the respective limbs of the U-shaped belt lock 92, thus securing said adult belt in position. The other belt lock 94 cooperates in a similar manner with the upper surface 106 of the other side arm 72.

In use, the side arms 71 and 72 are first secured at the desired height. Thereafter installation is continued as described for the embodiment illustrated in FIGS. 1 to 7. Finally, the belt locks 92 and 94 are engaged to prevent any slack in one part of the adult seat belt from being fed through to another part.

It will usually be preferable to secure whichever the arms 71 and 72 is on the opposite side to the adult seat belt buckle in its lowest position so as to minimise the required length for the adult seat belt. Alternatively, if the adult seat belt is long enough and it is expected that the child seat will frequently be moved from one side of the vehicle to the other, it may be preferred to secure both arms 71 and 72 at the same height so that no adjustment is necessary when the position of the child seat in the vehicle is changed.

The side projections 30 and 32 of FIGS. 1 to 7 may be provided with belt locks similar to the belt locks 92 and 94 of FIGS. 8 and 9.

I claim:

1. A forward facing child safety seat, having a seat body with a seat portion and a backrest portion for the child, and a base portion adapted to rest on a motor vehicle seat and to be secured in position on the vehicle seat by means of an adult lap belt which passes between a seated occupant of the child seat and a vehicle seat-back, wherein the base portion has a rear projection adapted to extend towards the vehicle seat-back above the level of a vehicle seat, two side projections extending upwardly and rearwardly from sides of the base portion so as to define, with side edges of the rear projection respective slots each of which is open at one end, and means for securing the side projections in a predetermined position relative to the base portion without obstructing the open ends of said slots, each side projection having an upper surface above a level of the rear projection.

2. A child safety seat according to claim 1, wherein the base portion is formed integrally with the seat body.

3. A child safety seat according to claim 1, wherein belt lock means is provided on the upper edge of at least one of the side projections.

4. A child safety seat according to claim 1, wherein the side projections comprise side arms which are mounted on the base portion by mounting means permitting height adjustment of their upper surfaces above the vehicle seat.

5. A child safety seat according to claim 4, wherein each side arm is movable independently of the other side arm.

6. A child safety seat according to claim 5, wherein the side arms are pivotally mounted on the base portion.

7. A child safety seat according to claim 4, wherein the side arms are pivotally mounted on the base portion.

8. A forward facing child safety seat, having a seat body with a seat portion and a backrest portion for the child, and a base portion adapted to rest on a motor vehicle seat and to be secured in position on the vehicle seat by means of an adult lap belt which passes between a seated occupant of the child seat and a vehicle seat-back, wherein the base portion has a rear projection adapted to extend towards the vehicle seat-back above a level of the vehicle seat, two side projections extending upwardly and rearwardly from sides of the base portion so as to define with side edges of the rear projection respective slots each of which is open at one end, and means for securing said side projections in a predetermined position relative to the base portion without obstructing the open ends of said slots, each side projection having an upper surface above a level of the rear projection, and the seat body is mounted on the base portion by means allowing the orientation of the seat body to be adjusted between an upright position and a reclined position.

9. A child safety seat according to claim 8, wherein the side projections comprise side arms which are mounted on the base portion by mounting means permitting adjustment of the height of their upper surfaces above the vehicle seat.

10. A child safety seat according to claim 9, wherein each side arm is movable independently of the other side arm.

11. A child safety seat according to claim 10, wherein the side arms are pivotally mounted on the base portion.

12. A child safety seat according to claim 9, wherein the side arms are pivotally mounted on the base portion.

* * * * *